United States Patent [19]
Keller et al.

[11] Patent Number: 6,059,148
[45] Date of Patent: *May 9, 2000

[54] METERING DEVICE

[75] Inventors: Wilhelm A. Keller, Obstgartenweg 9, CH-6402 Merlischachen, Switzerland; Laurence Richard Penn, Northants, United Kingdom

[73] Assignee: Wilhelm A. Keller, Merlischachen, Switzerland

[*] Notice: This patent is subject to a terminal disclaimer.

[21] Appl. No.: 09/178,647

[22] Filed: Oct. 26, 1998

Related U.S. Application Data

[63] Continuation of application No. 08/699,636, Aug. 19, 1996, Pat. No. 5,850,946, which is a continuation-in-part of application No. 08/317,595, Oct. 3, 1994, Pat. No. 5,547,110.

[51] Int. Cl.[7] .............................. G01F 11/00; F16K 25/00
[52] U.S. Cl. ......................... 222/219; 222/224; 251/172; 251/174
[58] Field of Search .................... 222/216–219, 222/224, 249, 368; 251/172, 174

[56] References Cited

U.S. PATENT DOCUMENTS

| | | | |
|---|---|---|---|
| 71,865 | 12/1867 | Fitzgerald | 222/249 X |
| 1,049,478 | 1/1913 | Hedgcock | 222/219 |
| 2,424,675 | 7/1947 | Wood | 222/368 |
| 3,001,543 | 9/1961 | Barton et al. | 137/242 |
| 3,037,738 | 6/1962 | Jackson et al. | 251/172 |
| 3,125,136 | 3/1964 | Miller et al. | 222/219 X |
| 3,167,398 | 1/1965 | Whittington | 222/219 X |
| 3,172,578 | 3/1965 | Kemp | 222/219 |
| 3,387,748 | 6/1968 | Brenchley | 222/219 X |
| 3,398,763 | 8/1968 | Richards | 251/172 X |
| 3,561,727 | 2/1971 | Scaramucci | 251/172 |
| 3,749,357 | 7/1973 | Fowler | 251/172 |
| 4,058,240 | 11/1977 | Becker | 222/368 |
| 4,416,397 | 11/1983 | Brown | 222/219 |
| 4,479,513 | 10/1984 | Koch et al. | 251/172 X |
| 4,491,248 | 1/1985 | Blackwell | 222/249 |
| 4,773,565 | 9/1988 | Rohlfing et al. | 222/219 X |
| 5,368,195 | 11/1994 | Pleet et al. | 222/219 X |
| 5,456,298 | 10/1995 | Tennis | 141/156 |
| 5,547,110 | 8/1996 | Keller et al. | 222/219 |

FOREIGN PATENT DOCUMENTS

| | | |
|---|---|---|
| 262 289 | 10/1959 | Australia . |
| 20 0961 | 12/1986 | European Pat. Off. . |
| 43 4149 | 6/1991 | European Pat. Off. . |
| 646776 | 4/1995 | European Pat. Off. . |
| 42 1532 | 2/1911 | France . |
| 42 20659 | 1/1993 | Germany . |
| 20 24158 | 1/1980 | United Kingdom . |
| 90 10198 | 9/1990 | WIPO . |
| 95/11512 | 7/1992 | WIPO . |

*Primary Examiner*—Kevin Shaver
*Assistant Examiner*—Keats Quinalty
*Attorney, Agent, or Firm*—Foley & Lardner

[57] ABSTRACT

A metering device includes an inlet and outlet for a material (liquids, gases or solid particles) to be metered, a rotatable ball driven by a shaft and interposed between the inlet and outlet seats. The rotatable ball has a transverse bore containing a sealess shuttling member which can reciprocate back and forth along the bore between two sealing seats so as to seal against one or the other. The sealess shuttling member is propelled by pressurized material which flows into the bore without surface-to-surface contact of the shuttling member with the bore wall until is engages one of the two sealing seats. Each time the rotatable ball rotates 180°, a metered shot is ejected resulting in a quasi continuous flow depending upon a rotatable ball revolution rate.

9 Claims, 8 Drawing Sheets

METERING DEVICE

CROSS REFERENCE TO COPENDING APPLICATIONS

This application is a continuation of application Ser. No. 08/699,636, filed Aug. 19, 1996 now U.S. Pat. No. 5,850, 946 which is a continuation-in-part of application Ser. No. 08/317,595 filed Oct. 3, 1994, now U.S. Pat. No. 5,547,110 issued Aug. 20, 1996.

BACKGROUND OF THE INVENTION

1. Field of the Invention

The present invention relates generally to a metering device and more specifically to a metering device which features a rotatable metering element.

2. Description of the Related Art

PCT Publication WO 90\10198 discloses a metering device which features a linearly movable metering head which is reciprocatively disposed within an elongated rotatable member. This device suffers from sealing problems, and, due to its linear design, is relatively bulky for some applications. U.S. Pat. No. 4,058,240 to Becker discloses an automatic drain for a compressed air system which uses a rotating ball. However, this arrangement suffers from the drawback that the ball has no through bore and therefore the amount of gas which can be vented per rotation is limited.

U.S. Pat. No. 3,387,748 to Brenchley discloses a motor driven metering valve wherein a free piston is reciprocatively disposed in a bore formed in a ball-shaped valve member. This free piston is provided with sealing rings and is retained within the bore by retaining rings. However, this arrangement suffers from the drawback that the sealing rings, with the passing of time, a) tend to trap particles and thus invite possible malfunction, and b) wear down and tend to lose their sealing properties. This latter problem allows a leak path to be established permitting fluid to escape past the piston and therefore reduce the precision with this the fluid can be metered.

U.S. Pat. No. 3,037,738 to Jackson et al. discloses a manually operated rotary valve which is not equipped with a metering arrangement. Adjustable valve seats are provided at the upstream and downstream ends of the valve.

SUMMARY OF THE INVENTION

It is the object of the present invention to provide a metering device which allows an exact metering, which solves, in a simple manner, the sealing problems of the rotatable member, and which offers additional advantages in relation to the above mentioned prior art arrangements.

It is a further object of the present invention to provide a metering device which can be used for metering gases, liquids and solid particles.

These objects are achieved with a metering device having a rotatable member in the form of is a ball having at least one transverse bore and held captive between two seats opposed to each other, each seat having a passage for inlet and outlet flow respectively. In a preferred embodiment, the inlet and outlet seats are spherical and cooperate with a sealess shuttling member having domed or spherical ends. The sealess shuttling member is carried in the material being metered and because of its shape and the absence of any shuttling member circumferential seals, sealing problems are minimized while allowing a compact design.

More specifically, a first aspect of the present invention comes in a metering device containing: a housing having a material inlet and a material outlet; a first rotatable ball member having a first transverse bore in which a sealess flow control metering member is disposed, the rotatable ball member being captured between two opposed seats disposed in the housing, each seat having at least one passage communicable with one of the material inlet and the material outlet; and mechanism for adjusting the position of at least one of the two seats within the housing.

A feature of present invention is that the sealess flow control metering member which may be constructed to have a specific gravity proximate to that of a fluid to be metered by the metering device.

A second aspect of the invention is that the sealess metering member is a cylindrical-shaped shuttling member having domed ends which are adapted to sealingly engage sealing seats at each end of the transverse bore.

A further aspect of the present invention includes a metering device, comprising; a housing having an inlet and an outlet; a rotatable metering member having a transverse bore, the rotatable metering member being connected with a drive shaft, the transverse bore having sealing seats at each end; and a sealess shuttling member disposed in the bore, capable of movement within that bore and the sealess shuttling member being retained in the transverse bore by the sealing seats at both ends having spherical surface portions adapted to engage the shuttling member and provide a fluid-tight seal.

BRIEF DESCRIPTION OF THE DRAWINGS

The invention will be explained hereinafter, by way of example, with reference to the accompanying drawings, in which.

DETAILED DESCRIPTION OF THE INVENTION

The following detailed description of the invention is directed to a metering device for fluids, including liquids and gases, however, such devices can be used for solid particles as well.

Figure 1:
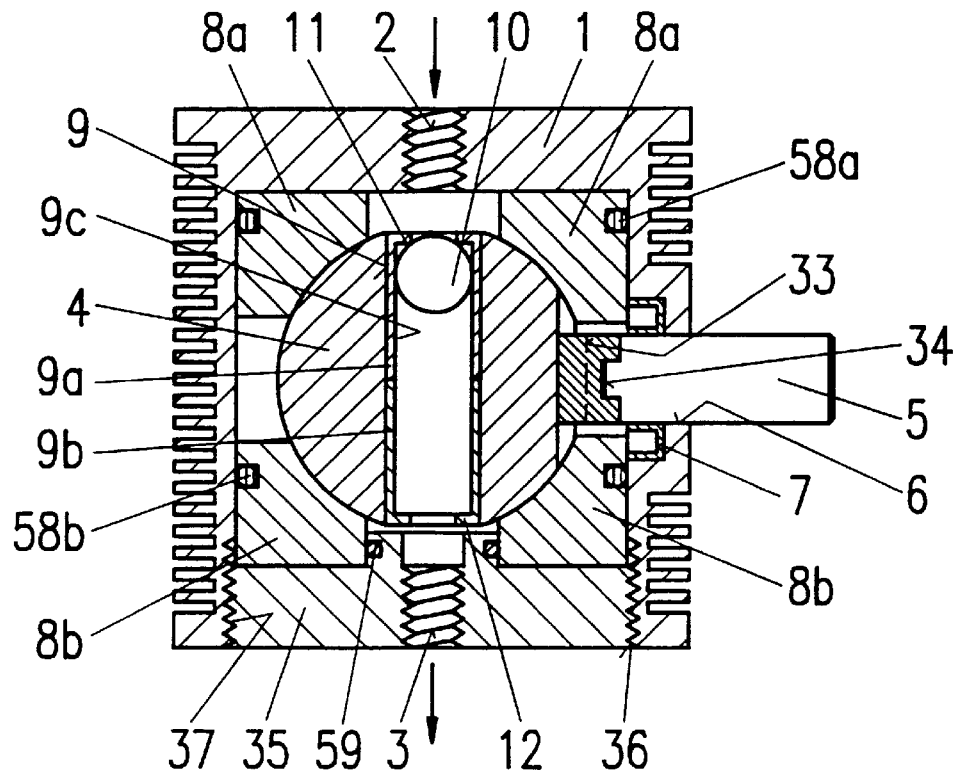
FIG. 1 shows schematically a section of a device according to the invention.

FIG. 1 shows schematically a first embodiment of a metering device which includes a housing 1, in which an inlet port 2 and diametrically opposed outlet port 3, are formed. The inlet port 2 is connected to a supply or source of fluid which requires metering and the outlet port 3 is connected to a dispensing apparatus. The metering member is a spherical, rotatable member, preferably a ball 4, which is coupled to a drive shaft 5 by way of a keyway shaft or like type of coupling 33. This drive shaft 5 is supported in a bearing 6 which is provided with an appropriate seal 7. A drive system such as an electric motor, gear box and the electric controls for driving the rotatable ball can be conventional arrangements.

It is preferable, from the point of correct and trouble free operation, that a spherical outlet seat 8b is provided at the outlet side of the rotatable ball 4 in order to form a seal at less cost and with greater durability and effectiveness than the seal arrangements used in the prior art. The inlet seat 8a may also be spherical. The rotatable ball 4 has a transverse bore 9 in which it is advantageous to install cylindrical sleeves 9a, 9b with an inner bore 9c and sealing seats 11 and 12 at each end respectively. The sleeves 9a, 9b may be made of any appropriate material enabling the formation of the sealing seats. The element which controls the metering operation is, in this embodiment, a shuttling ball 10 which can reciprocate back and forth along the inner bore 9c within and sealing against the seats 11, 12.

When a fluid under pressure is introduced at the inlet port 2, the rotatable ball 4, which is held between the seats 8a, 8b, is pressed against the outlet seat 8b by the applied pressure on the upper surface of the inlet seat 8a. As a result, any change of pressure in the fluid produces a self-compensating feature with respect to the sealing between the rotatable ball and the spherical outlet seat 8b.

While the inlet seat 8a and the outlet seat 8b must be sealed vis-a-vis the housing, e.g. by O-ring seals 58a, 58b or other sealing means, it will be understood that this system allows compensation for wear of the rotatable ball and its seats. The flow of fluid can also serve for cooling any heat generated due to friction of the rotatable ball assembly against the seats.

The outlet seat 8b may be pressed against the rotatable ball 4 via an adjusting screw thread. To this end the housing may comprise a closure 35 with an external thread 36 fitting in an internal thread 37 at the housing, said closure being sealed against the outlet seat 8b by an O-ring 59 or any other sealing means.

Figure 2:
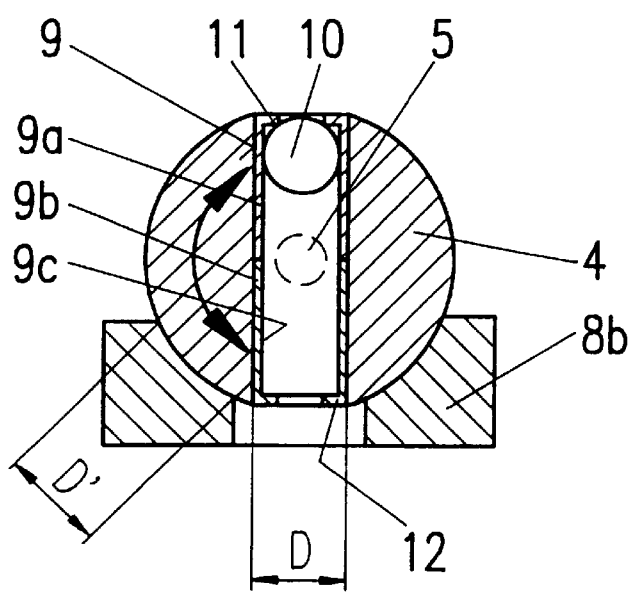
FIG. 2 shows a section of the device of FIG. 1 rotated 90° with respect thereto.

It follows from FIG. 2 that the length D' of the arc of the outlet seat 8b in contact with the rotatable ball must exceed the diameter D of transverse bore 9, in order to prevent leakage as the transverse bore 9 rotates past the outlet seat 8b. It also follows that a pressure differential must exist between the inlet and the outlet side of the rotatable ball 4 in order that the full movement of the shuttling ball 10 takes place during rotatable ball 4 rotation between the seats 8a and 8b so as to ensure precise levels of metering and adequate sealing.

The operation of the device of FIG. 1 is as follows: Assuming that the total metering unit is primed, the fluid, under pressure and to be metered, is supplied via inlet port 2 and acts on the shuttling ball 10 in a manner which shuttles it from the seat 11 and down inner bore 9c to the second seat 12, thus expelling one volumetric shot of fluid. After a rotation of approximately 180° of the rotatable ball 4, the same situation as in FIG. 1 is presented and the shuttling ball 10 is again pushed down the sleeve bore until it reaches the other seat and seals, having metered and expelled a further volumetric shot of fluid. With a rotational speed of 500 rpm and an expelling volume in sleeve bore 9c of 0.25 ml, a flow rate of 250 ml per minute is achieved. Both the relatively small volume and the rapidity of the metered shot combine to produce what appears to be an uninterrupted flow. A clearly intermittent flow or shots can be achieved by rotating the rotatable ball in 180° increments with subsequent pauses.

It is appreciated that such a metering device has the capacity to work with fluids or solids in a wide range of applications.

The above mentioned example results in a cube-like housing of about 55 mm length of side with a rotatable ball diameter of about 25 mm, a shuttling ball diameter of about 6 mm, and a stroke of about 9 mm. This demonstrates clearly the compactness of the efficient metering device. Depending on the size of the device, the characteristics of the substances to be metered, the flow rates and the pressure employed, different materials can be used for the rotatable ball and its seat. If very low wear and high resistance to chemical substances are needed, ceramics can be used, and for small high precision devices, sapphire or ruby. Otherwise, steel or plastic material may be used.

Figure 3A:
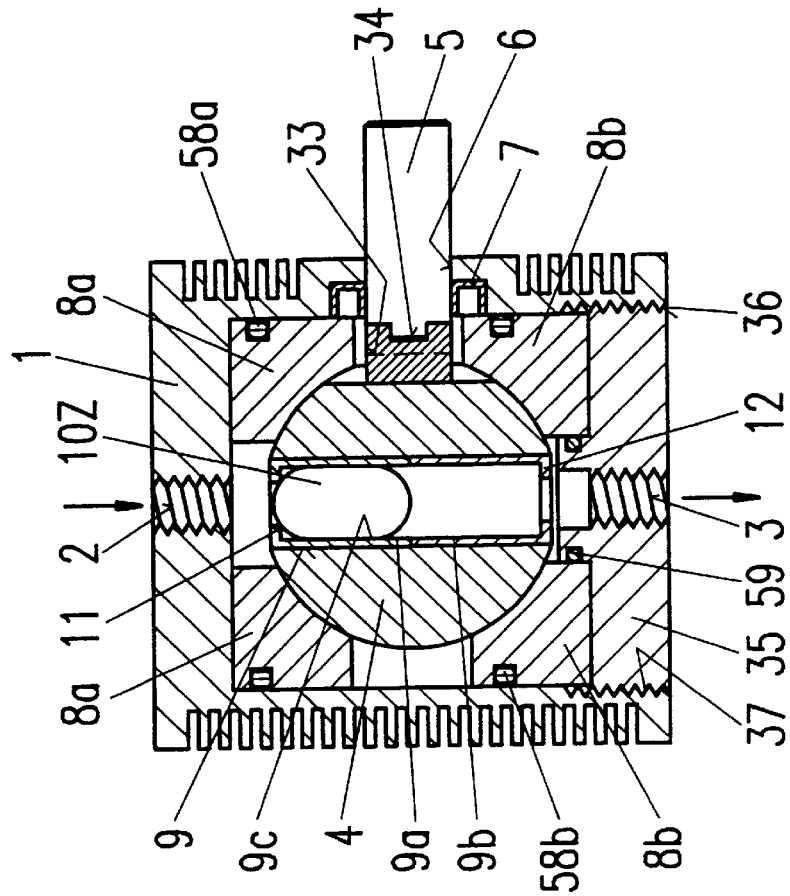
FIG. 3A shows a third embodiment wherein the sealess shuttling member has a "Zeppelin" or capsule-like shape.
Figure 3:
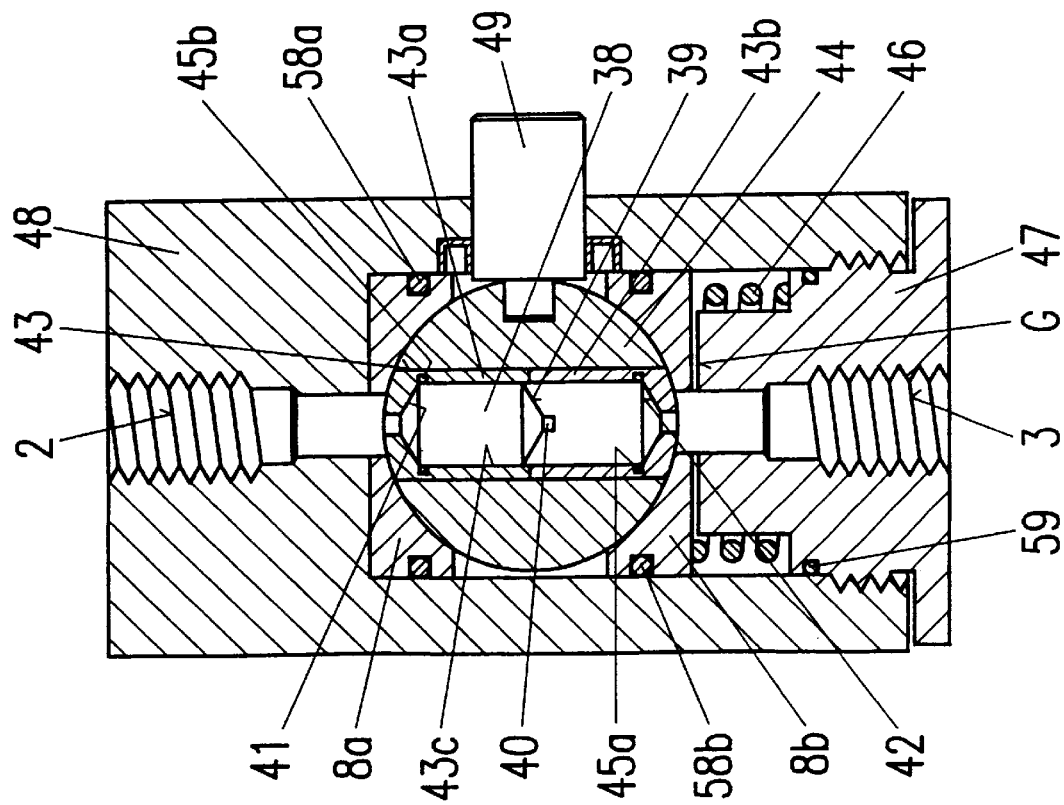
FIG. 3 shows a section of a second embodiment of the invention.

FIG. 3 shows a variant to FIG. 1 which is particularly suited for metering gas or any other compressible fluid. The shuttling ball is replaced by a shuttling cylindrical piston 38 having tapered ends 39 ending in a short cylinder 40, both of which match the contours of the corresponding seats 41, respectively 42, at the ends of sleeves 43a, 43b within inner bore 43c and further comprising a sealing means, e.g. sealing rings 45a, 45b at each seat, all of which is installed in bore 43 of rotatable ball 44. The outside contour of the seats is matched to the spherical shape of the rotatable ball 44. In this variant the outlet seat 8b is pressed against the rotatable ball by a spring 46 located between the outlet seat 8b and the threaded closure 47. The housing 48 is shown schematically, as are inlet 2 and outlet 3. There is in this case, like the embodiment shown in FIG. 1, only one drive shaft 49. However, in this instance the shaft is not keyed, but is rigidly attached directly to the rotatable ball, since the outlet seat 8b of the rotatable ball is spring tensioned.

In operation, gas under pressure originating from the inlet, moves the piston 38 towards seat 42 thus filling the resulting cylindrical space behind piston 38 as it moves forward until stopped by the outlet seat 42. The rotatable ball 44 is then rotated approximately 180° and the shuttling piston 35, moving to the opposite seat 41, ejects that gas. When all the gas has been expelled from the cylindrical space through the outlet port 3, the piston is flush with the contour of the seat 42. Thus, when the rotatable ball 44 is rotated a further 180°, the volume within the seat 42 and now taken up by piston 38 does not carry any gas back to the inlet port area 2. The amount of the gas metered from the inlet 2 to the outlet 3 is directly related to the gas pressure in the inlet area and a necessarily lower gas pressure in the outlet area 3.

FIG. 3A shows an embodiment which is basically similar to those shown in FIGS. 1 to 3, but features a cylindrical shuttling member 10Z which is provided with spherical ends. This configuration has the advantages that the rounded ends facilitate the use of same type of seats as are used with the ball type member, while, compared to a ball, the elongated configuration increases the potential leak path past the shuttling member 10Z and therefore reduces leakage. By way of example, using a ball shuttling member having a diameter of 16.00 mm in a bore having a diameter of 16.05 mm, 99.38% of the bore cross-sectional area is taken up by the ball shuttling member leaving only 0.62% for the leak path around the member, whereas with a cylindrical shuttling member, the leak path resistance is greatly magnified. Experiments show that this arrangement achieves no perceptible difference between theoretical and actual metering accuracy.

A further advantage of this shape is that it can be readily made hollow so as to allow the specific gravity of the total volume of the shuttling member 10Z to be adjusted as closely as possible to that of the material which is to be metered. By arranging it so, inertial effects are reduced thus further minimizing already insignificant leakage past the shuttling member.

The elongated spherical ended type of sealess shuttling member as well as the spherical type ball shuttling members need not be a high precision fit in the bore. When used with liquids for example, there is virtually no reason for the liquid to overtake the shuttling member as it is carried along the bore at the front of the flow because the shuttling member is trapped within the liquid in a restricted channel. In fact, if the specific gravity of the shuttling member is matched with that of the fluid, there is no reason for the liquid to overtake the shuttling member. Any reasonable wear of the shuttling member and bore wall has a negligible effect on performance.

The ball 10 and all of the other sealess shuttling elements used in the embodiments of this invention, can be made hollow or in any suitable manner in order to adjust the specific gravity of this sealess shuttling member. However, the length of the above mentioned piston 38 and elongated spherical ended type shuttling member 10Z should be selected relative to its diameter in a manner to prevent it from jamming within the bore and scuffing the wall of the metering bore.

Figure 4:
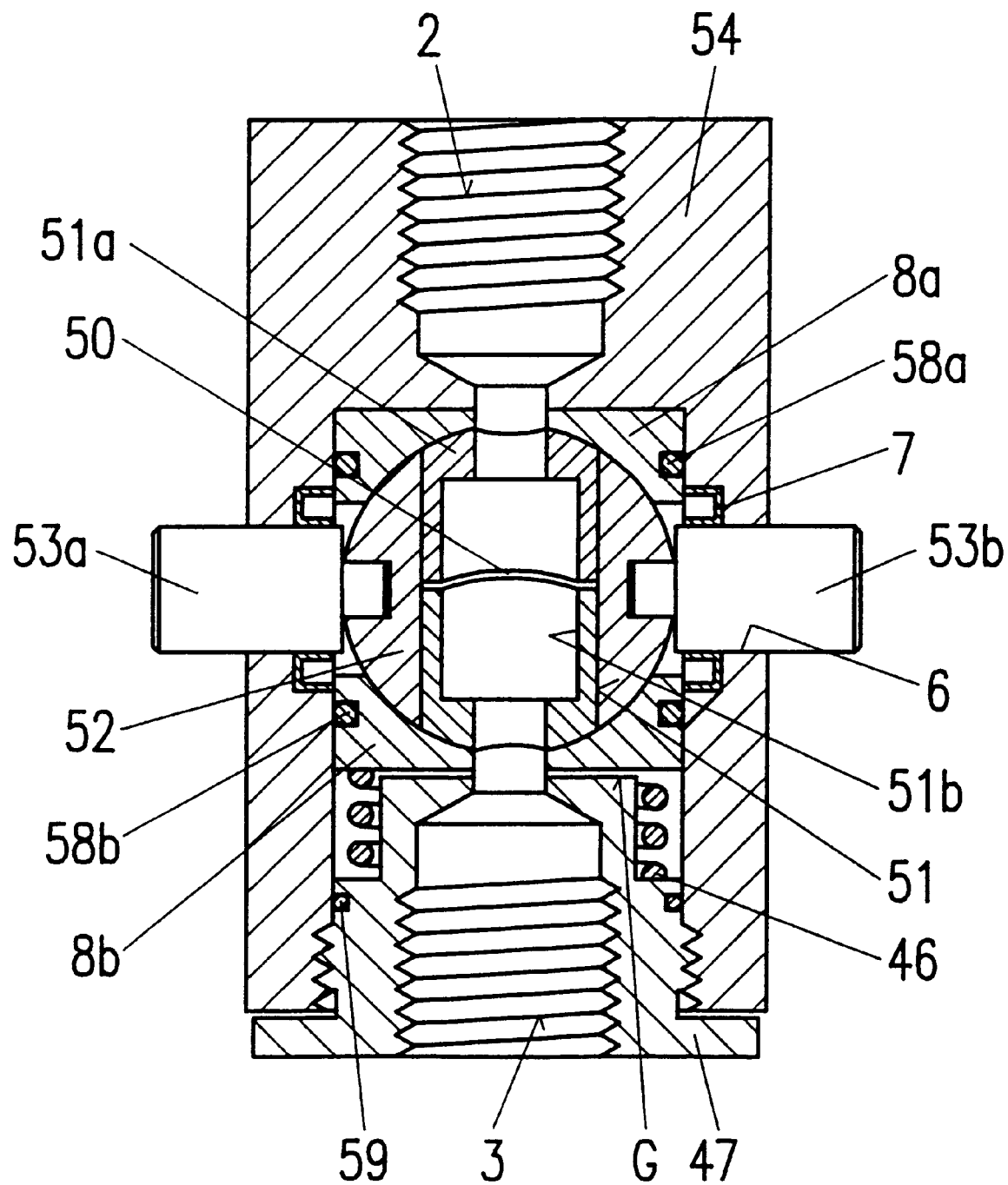
FIG. 4 shows a section of a fourth embodiment of the invention.

The embodiment of FIG. 4 shows another variant of the metering means, a diaphragm 50, fixed by retaining means in the middle of inner bore 51b of sleeve 51a within the transverse bore 51 of the rotatable ball 52 which is seated in the same seats 8a, 8b as in the previous embodiments, seat 8b being spring tensioned as in FIG. 3. It is obvious that inner bore 51b of the sleeve needs no seats. The rotatable ball 52 is supported by two directly attached shafts 53a, 53b, one of which is driven. The housing 54 is similar to the housing 48 of FIG. 3 as are also the other components. This embodiment works analogously to the previous described embodiments. In the embodiments of FIG. 3 as well as in FIG. 4 a gap G is indicated between the closure means and the adjustable seat.

Figure 5:
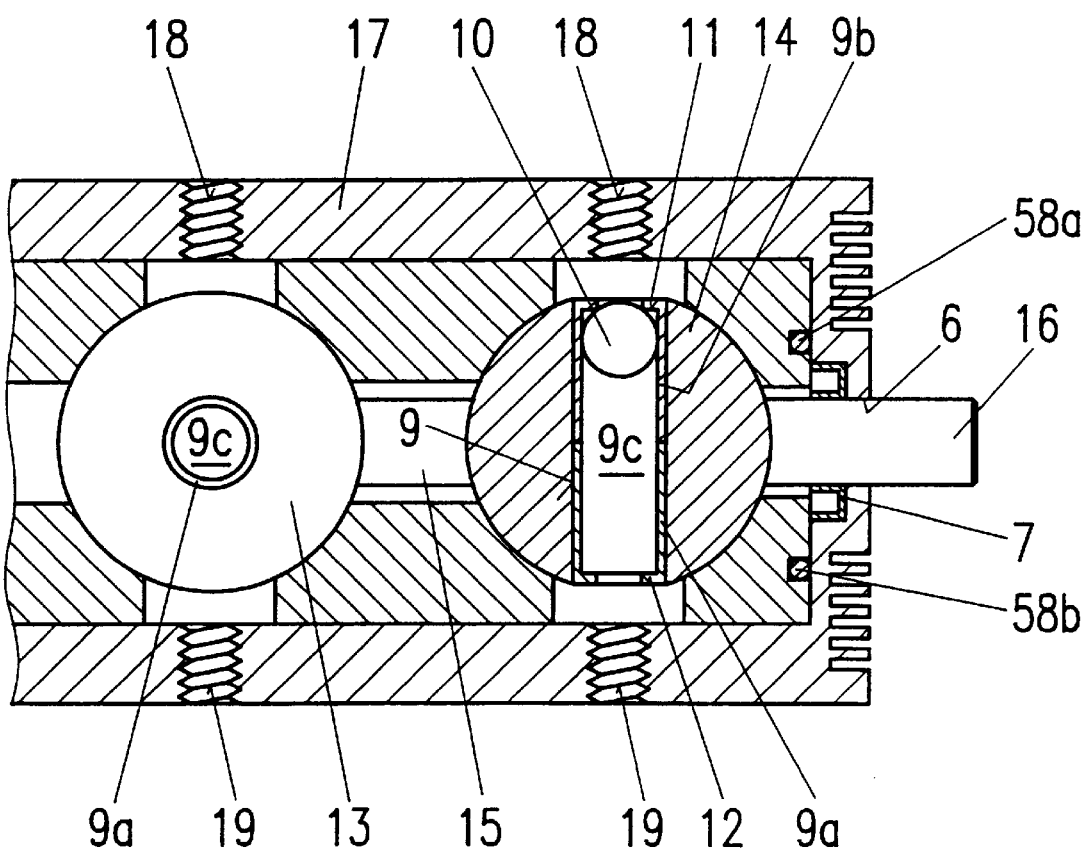
FIG. 5 shows a section of a further embodiment of the invention with two metering units.

FIG. 5 shows an embodiment in which the metering capacity has been doubled while simultaneously providing a smoother flow, by employing two rotatable balls 13 and 14 with a shuttling ball 10 in each, sliding in inner bore 9c between equal seats 11 and 12, the two transverse bores 9c being arranged at a 90° angle in relation to each other. The two rotatable balls 13 and 14 are connected by a connecting piece 15 and one rotatable ball 14 is driven by the drive shaft 16, being provided with bearing 6 and seal 7. Housing 17 has two inlets 18 and two outlets 19. It is evident that also in this case the inlet pressure must be maintained above, and preferably with a safety factor, the required outlet pressure. It will be further appreciated that the invention, specifically the metering device, is not limited to one or two rotatable balls. Therefore, the number of inlets and outlets may vary and the transverse bores may be arranged at an angle of 180°/N, if N is the number of rotatable members.

Figure 6:
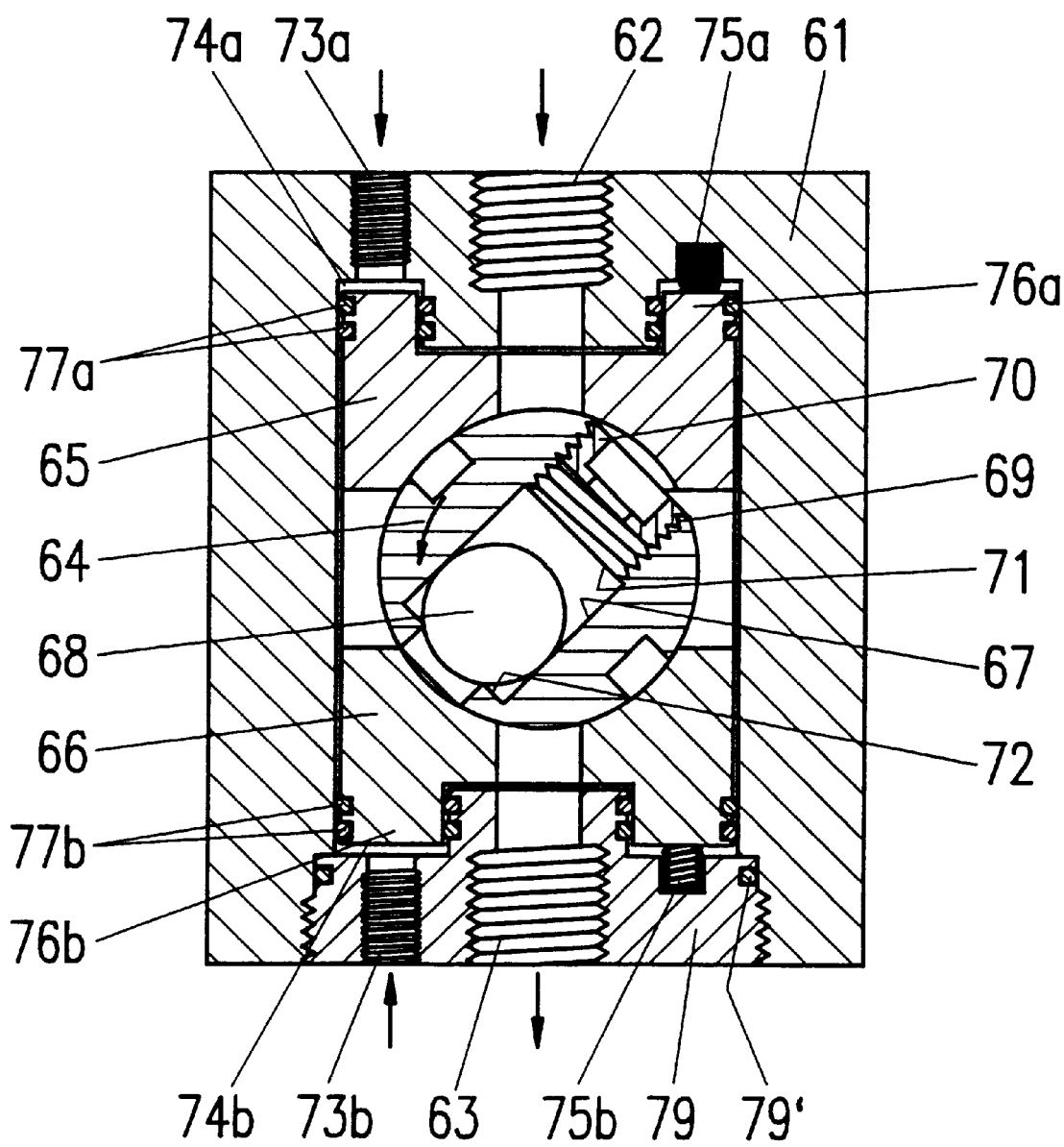
FIG. 6 shows a variant of a further embodiment of the invention.

As different from the aforementioned embodiments, FIG. 6 shows a variant such that the spherical seats 65 and 66 may be exposed to independent fluid pressures. The spherical inlet seat 65 has a protruding annular face 76a which is situated inside the housing 61 within an annular chamber 74a where it is sealed by sealing rings 77a, tensioned against the rotatable ball 64 by a spring 75a, and subjected to fluid pressure through a port 73a. Correspondingly, the spherical outlet seat 66 has a protruding annular face 76b which is situated inside the housing 61 and the removable housing end plate 79 within an annular chamber 74b where it is sealed by sealing rings 77b, tensioned against the rotable ball 64 by a spring 75b, and subjected to fluid pressure through a port 73b. Thus apart from the pressure of the fluid to be metered which enters through the port 62 and acts upon the face of the seat 65, the same or another fluid pressure can be applied and regulated through the port 73a to act upon the annular face 76a. Also, apart from the pressure of the fluid having been metered which exits through the port 63 and acts upon the face of the seat 66, the same or another fluid pressure can be applied and regulated through the port 73b to act upon the annular face 76b. The combination of the above provides various options to ensure sealing of the seats 65, 66, against the rotatable ball 64 with the springs 75a, 75b providing pretensioning of the spherical seats 65, 66, against the rotatable ball 64.

As a variant, transverse bore 67 has a partial thread 69 with an adjusting screw 70 such that the position of seat 71 may be adjusted from zero shuttling ball movement up to a maximum movement, whereas seat 72 is fixed. This variant can be used for all embodiments, independently of the number of bores.

It can be appreciated that the pressure on the spherical seats need not be independently provided and that the pressure of the fluid to be dispensed may be sufficient and used alone.

FIGS. 7–11 cover further embodiments of the invention whereby the rotatable ball has more than one transverse bore for metering. Furthermore, the joint lines between the spherical inlet and outlet seats may, unlike previous embodiments, be other than parallel to the inlet and outlet walls and approximately diagonal, yet allowing for a sealing means between that joint and the housing, such that any potential leakage between that joint line is prevented from flowing through the transverse bores to the outlet port when a transverse bore is adjacent to the joint line.

Figure 7:
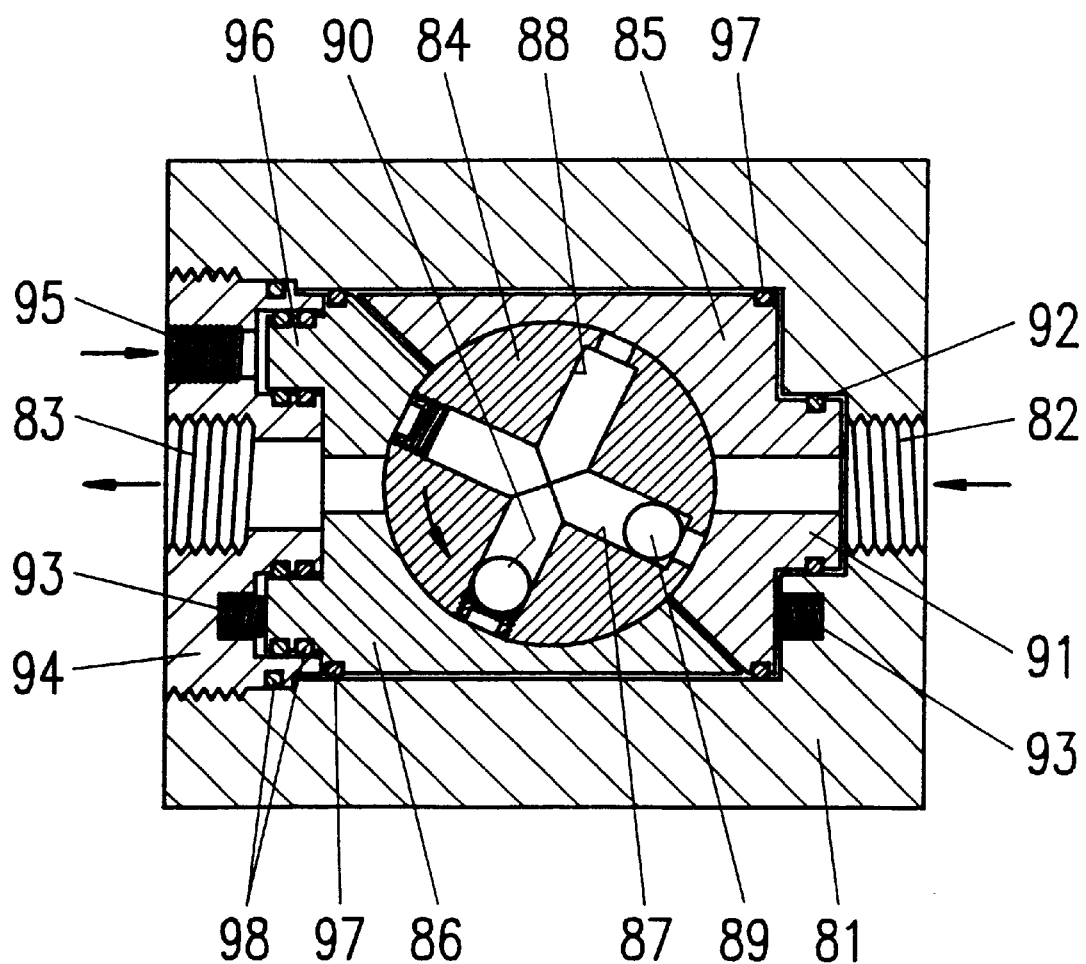
FIG. 7 shows a further embodiment of the invention with a rotatable ball having two transverse bores.

Compared with FIG. 6, FIG. 7 shows a variant of the independent, and/or material input flow pressure on the seats, and comprises a housing 81, having an inlet port 82 and diametrically opposed an outlet port 83, whereby inlet port 82 is connected to a supply and outlet port 83 to a dispensing apparatus. The rotatable ball 84 is held by the two approximately diagonal, divided spherical seats 85 and 86 and comprises two transverse bores 87 and 88, with the same type of seats as in the previous embodiment, for the two metering means, shuttling balls 89 and 90. In this embodiment the two bores 87, 88 intersect at the center of the rotatable ball 84.

In this case, as different from the embodiment of FIG. 6, spherical inlet seat 85 is provided, at the inlet port 82, with a piston 91 which has a smaller diameter than the outer diameter of the spherical inlet seat and which is subjected to the fluid pressure at that inlet. This arrangement further comprises a O-ring seal 92. The spherical inlet seat is also pre-tensioned by spring means 93 located inside housing 81. The insertable housing element 94 at the spherical outlet seat 86 is similar to the corresponding element of the previous embodiment. That is to say, it comprises fluid inlet port 95, and spring means 93, and thus also the corresponding portion of the spherical outlet seat 86 with annular face 96 and sealing means 98. Each spherical seat further comprises an outer diameter O-ring seal 97.

The spherical outlet seat 96 may be pressurized through fluid inlet port 95 which is connected either to the inlet pressure fluid or to an independent fluid pressure means. The provision of pressure means for each spherical seat enables an exact adjustment of the pressure force, whereby pressure control means may be provided at fluid inlet port 95. Another adjustment means is provided by adapting the cross-sectional area of piston 91. Any such combination being to form a seal between the spherical seats and the rotatable ball. It is appreciated that this pressure application technique may be also applied to the previous embodiments.

Figure 8:
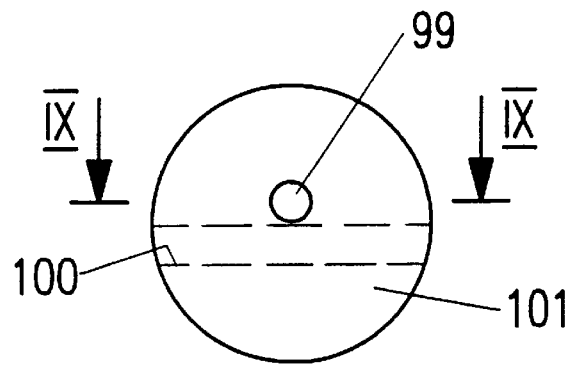
FIG. 8 shows a variant to the embodiment with the rotatable ball having two off-centered transverse bores.
Figure 9:
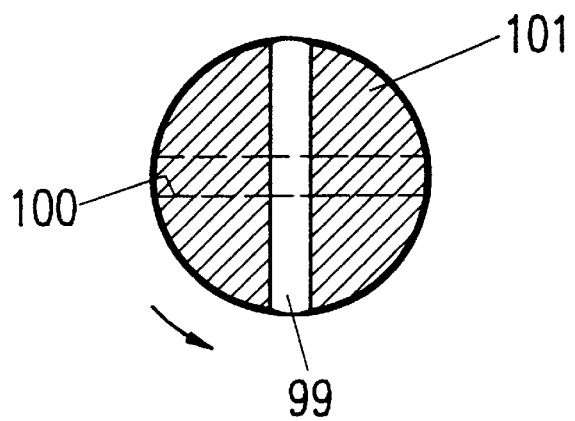
FIG. 9 shows a section according to line IX—IX in FIG. 8.
Figure 10:
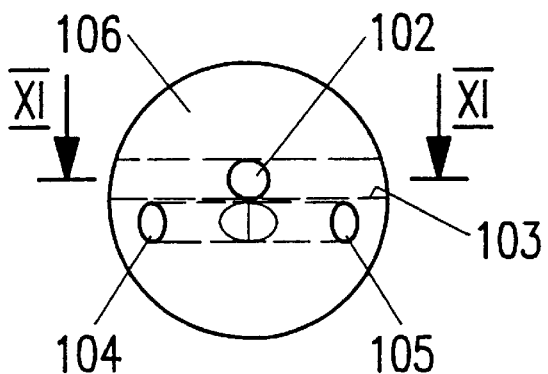
FIG. 10 shows a further embodiment of the invention with a rotatable ball having two pairs of transverse bores.
Figure 11:
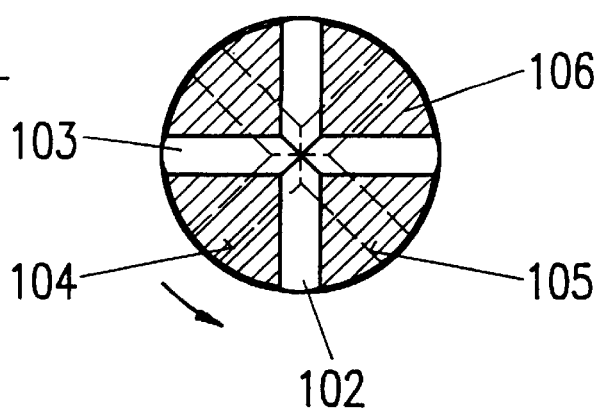
FIG. 11 shows a section according to line XI–XI in FIG. 10.

Another embodiment according to FIGS. 8 and 9 uses two transverse bores 99, 100 which are arranged at ninety degrees to each other and which are off center within the rotatable ball 101. In the embodiment shown in FIGS. 10 and 11, one pair of off centered bores 102 and 103 are arranged at 90° to each other and are at 45° to a second off centered pair of 90° related bores 104, 105 within rotatable ball 106.

As a result of all the above, an increased volume of metered output per rotatable ball cycle may be achieved. For example, two transverse bores provide four metered outputs per cycle, and four transverse bores eight metered outputs per cycle. This is advantageous in decreasing pulsation and lowering potential component wear relative to revolution speeds.

Figure 12:
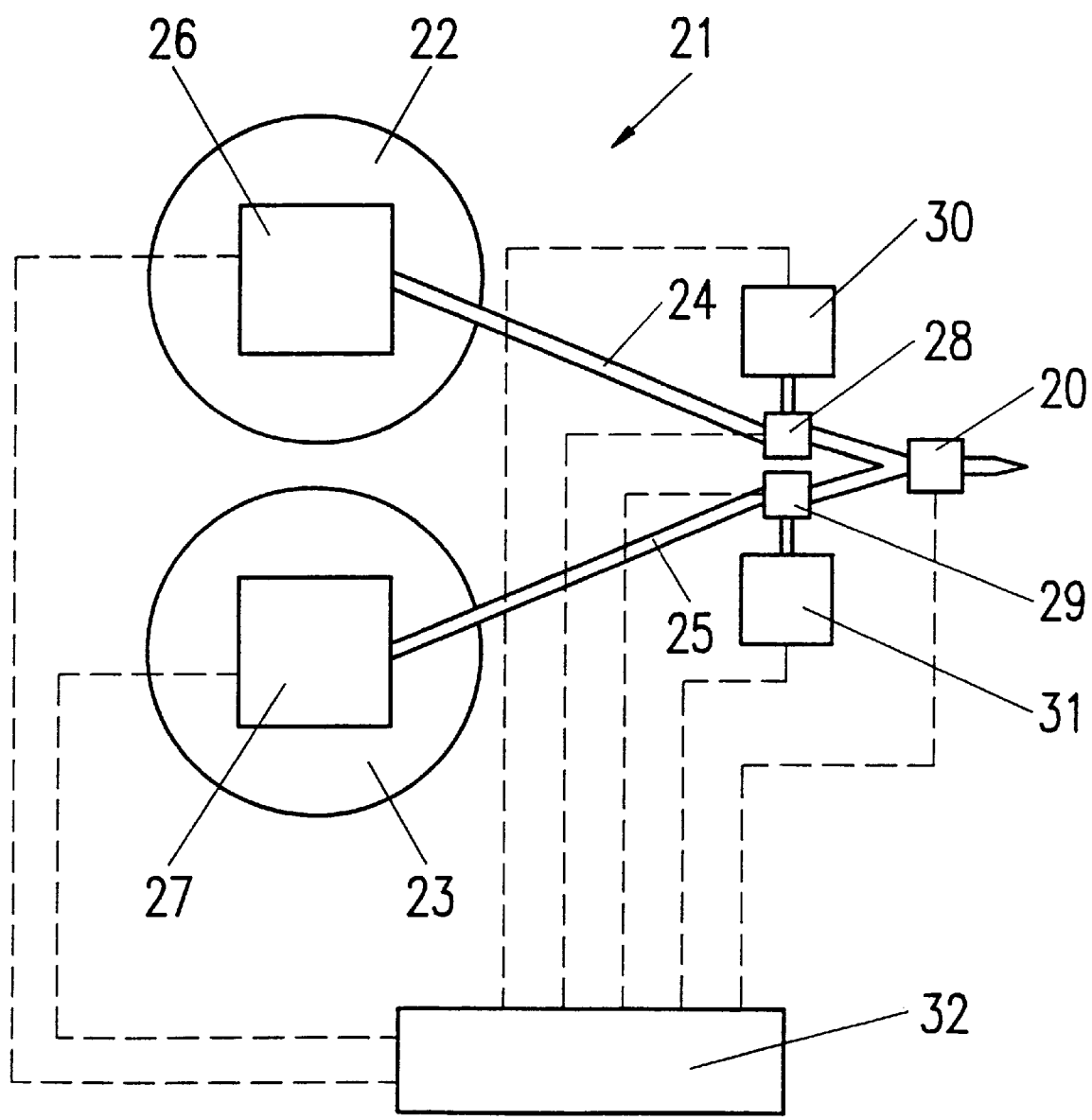
FIG. 12 shows an use of the invention in a layout for a two component proportioning and mixing apparatus.

FIG. 12 shows schematically a possible application of two metering devices of the invention in a proportioning and mixing apparatus 21 for a two component material. Numerals 22 and 23 denote two storage containers for the two components. Pipes 24 and 25 are connected to pumps 26 and 27 or other pressure sources. The pumps transport the material (fluid) under pressure to metering devices 28 and 29, the outlets thereof being attached to a mixing device 20, which can be of the static or dynamic type. The electric motors 30 and 31 of the metering devices as well as the metering devices themselves are connected to and controlled by a computerized control unit 32, which controls also the storage containers, the pumps or other pressure sources, as well as the mixing device in case it is an electrically driven mixing device. It is evident that the pressure of the pumps or other pressure sources as well as the delivery of the metering devices can be different one from another, and that the electric parameters can be adjusted and varied.

It follows from the above description that the devices of the invention are less complex, relatively more compact and smaller in size and have relatively lower wear than known devices. They are self-adjusting or may be adjusted to compensate for wear and provide complete sealing against leakage during rotation, thus providing optimum metering accuracy as well as acting as a perfect shut-off valve in any angular position when rotation has stopped and metering has ceased.

Furthermore, such a metering device allows an exact metering of fluids, in shot or flow form, has a very simple construction with few working parts and thus may easily be placed in a pressure transfer system for liquids and gases.

A Zeppelin- or elongated spherical ended shaped sealess shuttling member can be used in place of a ball-shaped shuttling member as deemed appropriate in any of the above disclosed embodiments which utilize a spherically-shaped shuttling member for fluid metering control.

What is claimed is:

1. A metering device comprising:

a housing having a material inlet and a material outlet;

at least one rotatable ball member having a spherical outer surface and at least one transverse bore, the rotatable ball member being captured between two opposed seats disposed in said housing, each seat having at least one passage communicable with one of the material inlet or the material outlet and having a seat face of essentially semispherical configuration complimentary to the spherical outer surface of said at least one rotatable ball member;

a sealess flow metering assembly disposed in said transverse bore of said at least one rotatable ball, said sealess flow metering assembly comprising spaced sealing seats, and a shuttle member movably disposed for selective engagement with said sealing seats; and an adjustment assembly disposed in said housing to adjust the position of at least one of said two opposed seats relative to the housing such that the essentially semispherical surface of said at least one of said two opposed seats is urged into mating engagement against the complimentary outer surface of said rotatable ball to enable material flowing from said material inlet to said material outlet to cool the complementary surfaces of the rotatable ball and the opposed seats.

2. A metering device according to claim 1, wherein said adjustment assembly comprises means responsive to fluid pressure of material flowing from said material inlet to said material outlet for adjusting said at least one of said two seats against said rotatable ball.

3. A metering device according to claim 1, wherein said adjustment assembly comprises an adjustable screw for adjusting said at least one of said two seats against said rotatable ball.

4. A metering device according to claim 1, wherein said adjustment assembly comprises a biasing member for adjusting said at least one of said two seats against said rotatable ball.

5. A metering device according to claim 4, wherein said biasing member is a spring.

6. A metering device according to claim 1, wherein said shuttle member is a ball.

7. A metering device according to claim 1, wherein said shuttle member is a cylinder.

8. A metering device according to claim 7, wherein said cylindrical shuttle member has spherical ends.

9. A metering device according to claim 1, wherein the shuttle member is so configured and arranged as to have a specific gravity proximate to that of the material to be metered by said metering device.

* * * * *